United States Patent [19]

Barr

[11] Patent Number: 5,988,866
[45] Date of Patent: Nov. 23, 1999

[54] FLOATING SLEEVE MIXER AND METHOD

[76] Inventor: Robert A. Barr, 504 Carolina Ave., Virginia Beach, Va. 23454

[21] Appl. No.: 09/083,190

[22] Filed: May 22, 1998

[51] Int. Cl.$^6$ .................................. B01F 7/08; B29B 7/14
[52] U.S. Cl. ................................................. 366/80; 366/82
[58] Field of Search ................................. 366/79, 80, 81, 366/82

[56] References Cited

U.S. PATENT DOCUMENTS

| | | | |
|---|---|---|---|
| 3,836,127 | 9/1974 | Csongor | 366/82 |
| 4,070,138 | 1/1978 | Stanwood . | |
| 4,112,516 | 9/1978 | Hotz | 366/80 |
| 4,332,482 | 6/1982 | Engler . | |
| 4,387,997 | 6/1983 | Klein et al. . | |
| 4,453,905 | 6/1984 | Bennett . | |
| 4,746,478 | 5/1988 | Fujisaki et al. . | |
| 4,749,279 | 6/1988 | Csongor | 366/82 |
| 4,802,140 | 1/1989 | Dowling . | |
| 4,901,635 | 2/1990 | Williams . | |
| 5,013,233 | 5/1991 | Semmekrot | 366/82 |
| 5,056,925 | 10/1991 | Klein . | |

*Primary Examiner*—Tony G. Soohoo
*Attorney, Agent, or Firm*—Thelen Reid & Priest

[57] ABSTRACT

A mixer for plasticable resins has a fixedly positioned heated barrel with a power driven screw mounted axially in the barrel bore, a driven rotor is axially aligned with and extending in a downstream direction from the downstream end of power driven screw. A series of elongated rotor flow transfer cavities are in the outer surface of the rotor. The rotor flow transfer cavities extending inwardly and are arranged in a plurality of axially aligned rows and a plurality of annular rows concentric to the axis of the rotor. A floating sleeve is coaxially positioned over the power driven rotor and interposed between the rotor and the barrel so as to be capable of independent rotation relative to both the power driven rotor and the barrel. The floating sleeve has a plurality of parallel outwardly extending ring flanges extending radially outwardly and inwardly facing a plurality of annular and elongated in cross-section outer sleeve flow channels each having an upstream end and a downstream end provided between adjacent ring flanges. A series of outflow apertures extend through the floating sleeve and communicate on opposite ends with the upstream end of an elongated outer sleeve flow channel of the floating sleeve flow channel and the downstream end of one of the elongated rotor flow transfer cavities of the rotor.

11 Claims, 4 Drawing Sheets

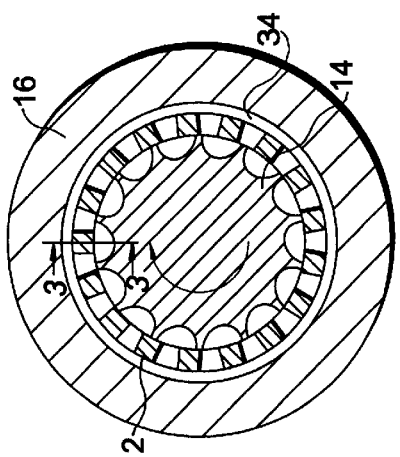
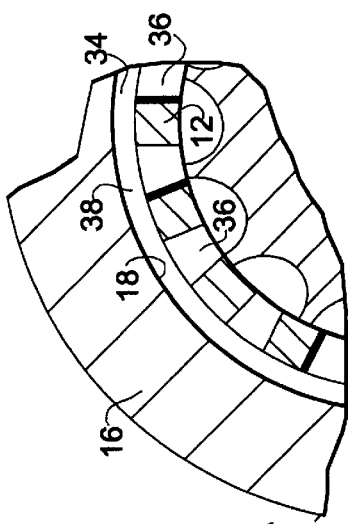
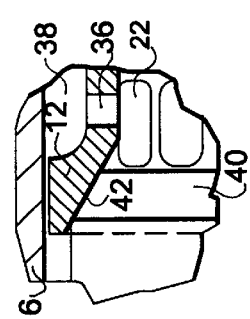
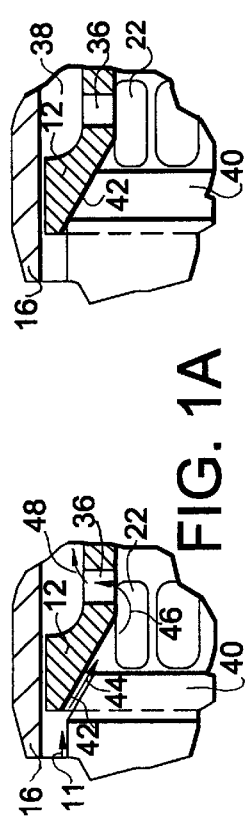
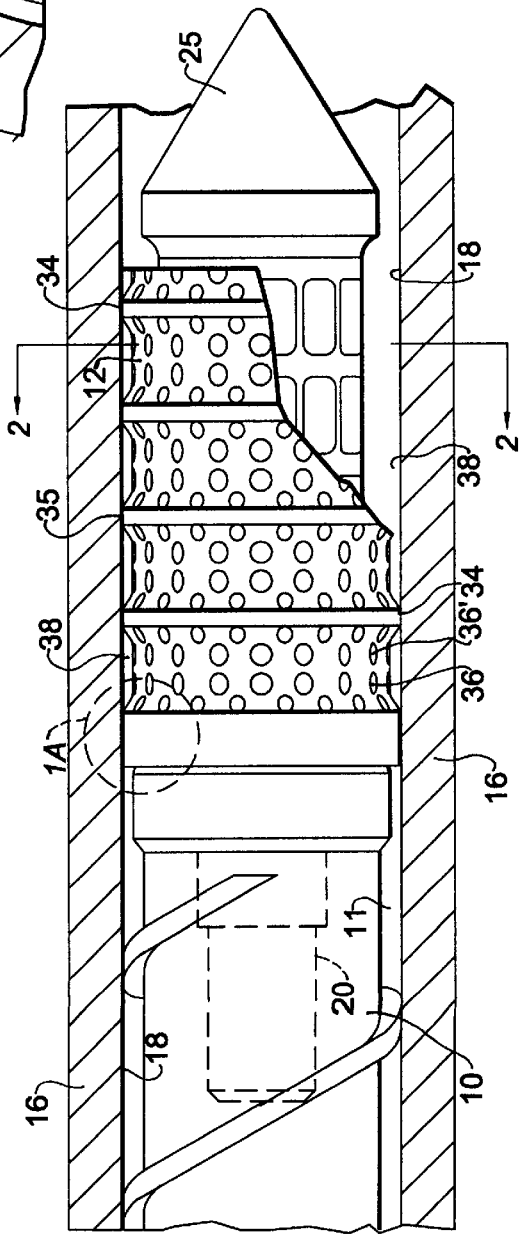
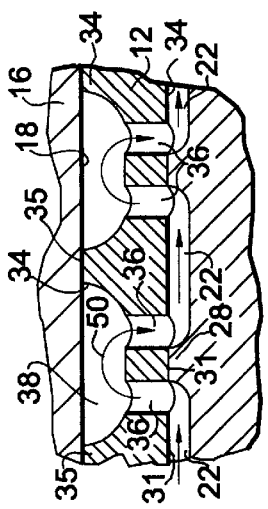
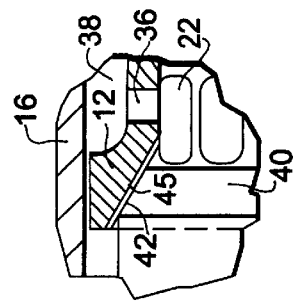

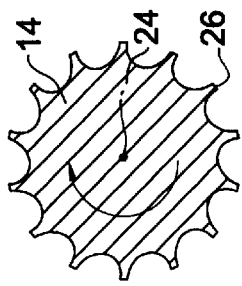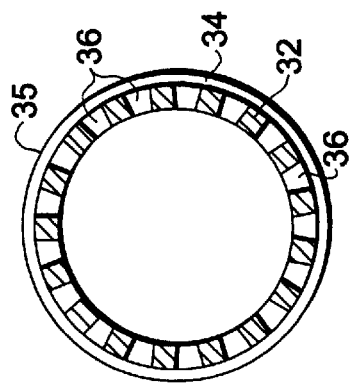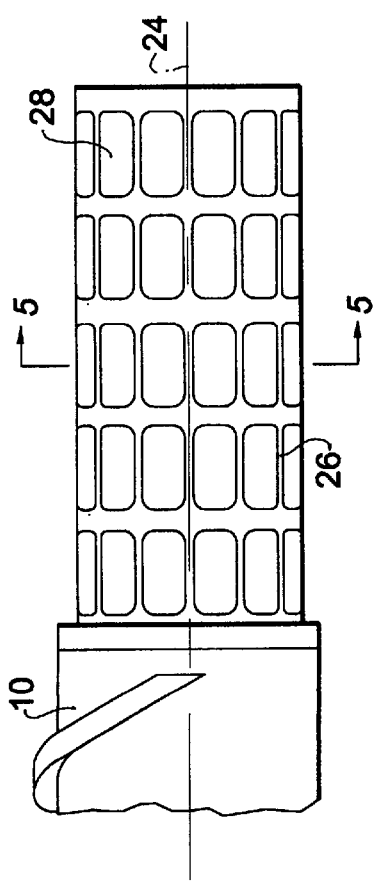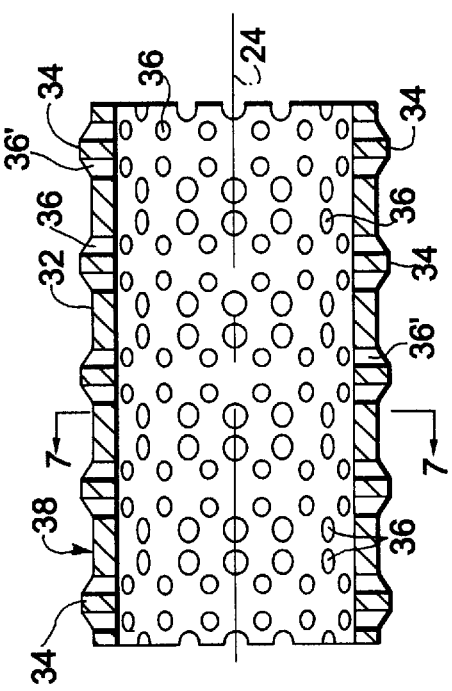
FIG. 5
FIG. 7
FIG. 4
FIG. 6

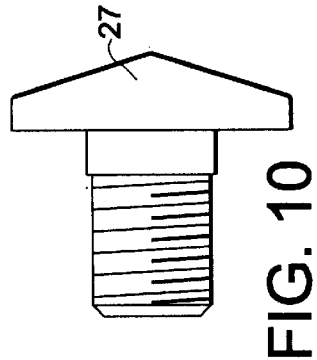
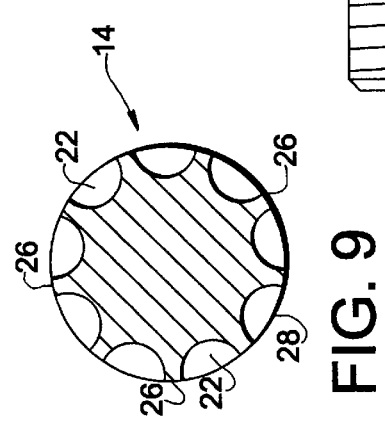
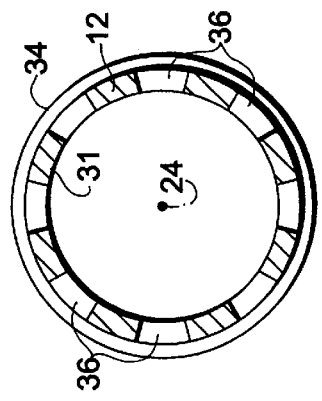
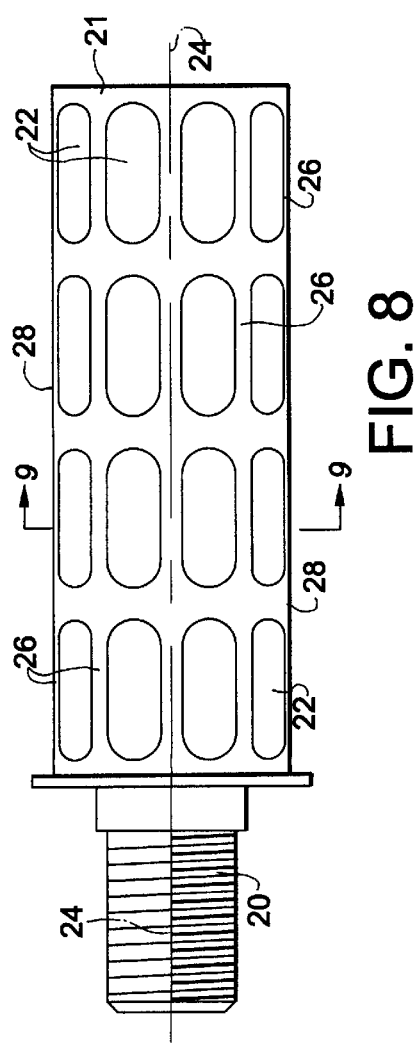
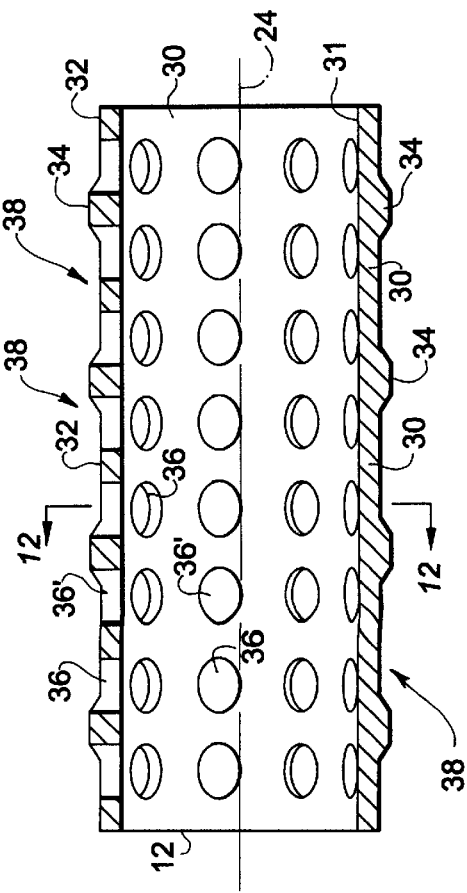
FIG. 10
FIG. 9
FIG. 12
FIG. 8
FIG. 11

FLOATING SLEEVE MIXER AND METHOD

BACKGROUND OF THE INVENTION

The present invention relates to a mixer assembly of the cavity-transfer type for use in extrusion of a mix of polymers in conjunction with the extruder screw of a polymer extruder. More specifically, the subject invention is directed to a mixer component provided adjacent the downstream end of an extruder screw and including a motor driven rotor coaxially positioned downstream relative to the extruder screw within the heated barrel of an extruder assembly. A floating sleeve is positioned over the rotor and facing the inner surface of the barrel and includes transfer openings in its outer surface for receiving heated mix from the rotor which is directed into contact with the inner surface of the barrel and then returned through apertures in the floating sleeve to cavities provided in the outer surface of the rotor.

Cavity transfer type extruder devices have been employed in the past as exemplified by British Patent Specification No. 930,339 which discloses a hollow cylindrical stator member and a cylindrical rotor member which is mounted for rotation within the stator. The facing cylindrical surfaces on the rotor and the stator carrier respective pluralities of rows of elongated longitudinally extending grooves or apertures arranged peripherally around each member and are spaced axially along each member in parallel relationship. The annularly extending rows of grooves on the outer surface of the rotor are offset relative to the annular rows of grooves on the cylindrical stator member.

The foregoing arrangement is such that the overlapping closed cavities on the rotor and the stator cause the molten material to progressively move annually along the length of the mixer to effect a thorough mixing of the components thereof Additionally, a similarly known machine of the foregoing type is described in British Patent Specification No. 1,475,216.

Applicant's earlier U.S. Pat. No. 4,779,989 discloses a stator bore provided with a plurality of curved inwardly facing grooves surrounding an inner driven rotor member also provided with a plurality of curved grooves on its outer surface. The stator elements of Applicant's aforementioned patent are fixedly positioned relative to the barrel housing in which they are mounted.

A different approach is revealed in U.S. Pat. No. 5,013,233 of Semmekrot which discloses a driven rotor provided with a plurality of dimple type cavities 22 and 23 arranged in annular rows and axial rows which sequentially move into alignment with openings 27 in a floating ring 9.

Other prior art approaches to the mixing of molten polymer components are disclosed in British Patent No. 1,475,216, European Patent Application No. 81304235.5 and U.S. Pat. No. 4,746,478.

While the aforementioned and other prior art devices have provided varying degrees of performance, they have uniformly been expensive and costly to manufacture. Additionally, they have not been easily adaptable to conventional extruder screw means without special and expensive machining and design considerations. Moreover, the industry has continuously demanded ever increasing production capability and mixing thoroughness beyond that of the prior known devices.

Therefore, it is a primary object of the present invention to provide a new and approved polymer mixing apparatus and method that is economical to fabricate while providing large flow capacities and optimum mixing results.

Additional objects, advantages and capabilities of the present invention will become apparent from the following detailed description which should be considered in conjunction with the accompanying drawings illustrating the preferred embodiment of the invention, as well as certain variations therefrom.

SUMMARY OF THE INVENTION

Achievement of the foregoing objects is enabled by the preferred embodiment of the invention which includes a heated barrel in which an extruder screw is mounted for rotation. A rotor extends axially from the downstream end of the extruder screw and a floating sleeve is provided in mating manner over the rotor. The rotor has an outer surface in which a plurality of rotor flow transfer cavities of elongated shape are provided in plural aligned annular groups about the periphery of the rotor with adjacent annular groups being separated axially by a plurality of outward extending rotor rings which engage the inner surface of the floating sleeve.

Axially parallel ribs separate the adjacent rotor flow transfer cavities circumferentially about the rotor. The floating sleeve has a plurality of outer sleeve flow channels extending in annular rows and axially parallel rows on its outer surface, The outer sleeve flow channels annular rows are separated by an outwardly extending ring flanges extending annularly about the periphery of the floating sleeve with a plurality of such flanges being provided to separate the plural annular rings of the sleeve flow channels. The upstream end of each outer sleeve flow channel communicates with an outward flow circular aperture which extends through the floating sleeve and communicates at its lower end with the downstream end of a rotor flow transfer cavity. The downstream end of the outer sleeve flow channel communicates with the upper end of an inward flow circular aperture extending through the floating sleeve and communicating on its lower end with the upstream end of the next adjacent flow transfer cavity of the rotor. Thus, flow occurs from the rotor cavity outwardly through the floating ring to the upstream end of an outer sleeve flow channel wherein the flow then moves axially downstream to exit through the outflow aperture to flow into the upstream end of the next adjacent flow transfer cavity of the rotor. The foregoing arrangement provides for a thorough mixing and continuous flow of the material with the fact that the floating sleeve is not mechanically connected to the rotor or any other part of the apparatus permitting movement of the sleeve to effectively aid in the mixing function.

BRIEF DESCRIPTION OF THE DRAWINGS

FIG. 1 is a side elevation view of the discharge end portion of the screw section of a single extruder screw assembly in which the present invention is connected to the outer end of the extruder screw portion with the barrel of the extruder being shown in section;

FIG. 1A is an enlarged view of the encircled portion 1A of FIG. 1 illustrating the inflow of molten polymer from the downstream end of the extruder screw into the floating sleeve and rotor means of the preferred embodiment;

FIG. 1B is an enlarged view of the same portion of FIG. 1 as that shown in FIG. 1A but illustrating the extruder screw and floating sleeve in a different position assumed when the extruder screw is reciprocated to the right to effect an extrusion with the end of the extruder screw and the facing surface of the floating sleeve blocking the escape of molten constituent from the mixer components during movement of the extruder screw, the floating sleeve and the rotor to the right as shown in FIG. 1;

FIG. 1C is an enlarged view similar to FIG. 1B but illustrating an alternative embodiment in which flow is always permitted into the floating sleeve regardless of the position of the extruder screw;

FIG. 2 is a section view taken along lines 2—2 of FIG. 1;

FIG. 2A is an enlarged view of a portion of FIG. 2 illustrating the relationship between the rotor, the floating sleeve and the barrel;

FIG. 3 is a sectional view taken along lines 3—3 of FIG. 2;

FIG. 4 is a side elevation view of the rotor;

FIG. 5 is a sectional view taken along lines 5—5 of FIG. 4;

FIG. 6 is a side elevation of a removable tip mounted in the downstream end of the rotor;

FIG. 7 is a side elevation view of the floating sleeve;

FIG. 8 is a section taken along lines 8—8 of FIG. 7;

FIG. 9 is a side elevation view of the downstream end of the extruder screw and the rotor illustrating the manner in which the rotor is mounted in and to the downstream end of the extruder screw;

FIG. 10 is a sectional view of the rotor taken along lines 10—10 of FIG. 9;

FIG. 11 is a sectional view of the floating sleeve taken along lines 11—11 of FIG. 8; and FIG. 12 is a section view of the floating sleeve taken along lines 12—12 of FIG.

DETAILED DESCRIPTION OF THE PREFERRED EMBODIMENTS

Figure 14:
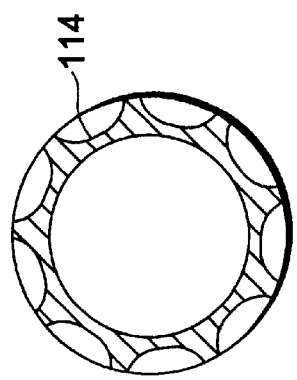
FIG. 14 is a section view taken along line 14—14 of FIG. 13.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Reference is made to the drawings in which the reference characters designate corresponding parts throughout the different figures of the preferred embodiments for practice of the invention. The main components of the invention comprise a conventional extruder screw 10 (FIG. 1) such as that of the type shown in Applicant's prior U.S. Pat. No. 4,779,989. A floating sleeve 12 is coaxially positioned relative to extruder screw 10 and a rotor 14 which is best shown in FIG. 8 is fixedly mounted on and attached to the downstream end of extruder screw 10. The floating sleeve 12 surrounds and is coaxial with the axis 24 of rotor 14 which is coextensive with the axis of extruder screw 10. The floating sleeve 12 is free to rotate about the axis 24 of rotor 14. Also, the sleeve and rotor 14 are capable of limited axial movement relative to each other between the positions illustrated in FIGS. 1A and 1B. The aforementioned constituents are mounted in a conventional cylindrical barrel 16 which is heated by conventional means (not shown) and which includes an inwardly facing cylindrical surface 18 as best shown in FIG. 1.

Rotor 14 comprises a stub member including a mounting stub 20 (FIG. 8) received in an axial aperture in the downstream end of extruder screw 10 as best shown in FIG. 1. A cylindrical body portion 21 is unitarily formed with the mounting stub 20 and includes an outer surface 23 provided with a plurality of elongated rotor flow transfer cavities 22 arranged in a series of annular rows about the periphery of the rotor. Each annular row of rotor flow transfer cavities is concentric with respect to the axis 24 of the rotor which is itself coextensive with the axis of the extruder screw. Additionally, the elongated rotor flow recesses 22 (FIG. 4) are arranged in axially parallel linear rows that are parallel to axis 24 as shown in FIG. 4. The axially parallel linear rows of rotor flow recesses 22 are separated by linear ribs 26 (FIG. 5) extending parallel to axis 24. Similarly, the annular rows extend about the periphery of rotor 14 in concentric manner with respect to axis 24 and are separated by annular rotor rings 28 as best shown in FIG. 4. A removable tip 25 is axially received and threaded into the downstream end of rotor 14 as shown in FIG. 1. Optionally, a different type of tip 27 shown in FIG. 10 can be used on rotor 14 in place of tip 25.

Floating sleeve 12 is formed of a cylindrical body 30 having an inwardly facing inner surface 31 and an outwardly facing cylindrical surface 32 as shown in FIG. 7. A plurality of outwardly extending annular ring flanges 34 having an outer cylindrical surface 35 are provided at equidistant locations from each other along the outer surface of the cylindrical body member 30 as shown in FIG. 7. A plurality of outflow circular apertures 36 and inflow circular apertures 36' are provided in annular rows in the cylinder body 30 and in linear rows as best shown in FIG. 7.

It should be noted that each annular row of outflow circular apertures 36 is connected at its upper end with the upstream (left) end of an outer sleeve flow channel 38 as best shown in FIG. 3. Similarly, the upper end of each inflow circular aperture 36' is connected to the right (downstream) end of the outer sleeve flow channel and has its lower end connected to the upstream end of the next adjacent rotor flow transfer cavity 22. Thus the paired apertures 36, 36' of each annular row of such apertures are positioned to communicate with the opposite ends of two adjacent elongated rotor flow transfer cavities 22 which are separated by a rotor ring 28.

The relationship of the floating sleeve 12 to the inner surface 18 of barrel 16 and the outer surface of rotor 14 is best shown in FIG. 3 in which it should be noted that the outer cylindrical surface 35 of each outwardly extending ring flange 34 is spaced from but closely adjacent the inner surface 18 of the barrel. Similarly, each annular rotor ring 28 of rotor 14 engages the inner surface 31 of floating sleeve 12 at the portion of surface 31 aligned with rotor rings 28 and between adjacent pairs of annular rows of paired apertures 36, 36'. The space between adjacent outwardly extending ring flanges 34 defines the elongated outer sleeve flow channels 38 which communicate with the outer ends of two of the circular paired apertures 36, 36' as shown in FIG. 3. However, the inner ends of the paired apertures 36 communicate with two different axially spaced elongated rotor flow transfer cavities 22 separated by an annular rotor ring 28 as shown in FIG. 3.

The downstream end of extruder screw 10 comprises a conical valve surface 40 which faces a conical valve seat surface 42 on the upstream end of floating sleeve 12 as shown in FIG. 1A. During the mixing phase of the operation, the conical valve surface 40 is spaced from the conical valve seat surface 42 as shown in FIG. 1A so that the molten material flows from the melt chamber 11 surrounding extruder screw 10 into the annular channel 44 between conical valve surface 40 and conical valve seat surface 42 as shown in FIG. 1A. However, when it is desired to initiate extrusion of the molten mix, the extruder screw 10 is moved to the right toward the floating sleeve to bring surface 40 into contact with the conical valve seat surface 42 as shown in FIG. 1B. Continued movement to the right of the rotor 10 consequently carries floating sleeve 12 and rotor 14 also to the right to effect extrusion of the molten material through discharge means (not shown) provided conventional manner at the right or downstream end of the barrel 16.

FIG. 1C illustrates an alternative embodiment in which a plurality of grooves 45 are provided in surface 42 of sleeve 12 to permit flow to continue into the interior of floating sleeve 12 at all times including when surface 42 engages the sleeve. This embodiment is used in extrusion operations. Holes could be used instead of grooves if desired.

It should be noted that during the mixing cycle, the flow through annular channel 44 enters the upstream flow transfer cavities 22 of rotor 14 and then flows radially outwardly as shown by arrow 46 through the outflow circular apertures 36 that are in the upstream end of floating sleeve 12. The flow then turns to the right and moves downstream as shown by arrow 48 in the outer sleeve flow channel 38 and then turns radially inward in the circular inflow aperture 36' in the manner shown by arrow 50 in FIG. 3. It is to be noted that the outer flow is illustrated by arrow 46, the downstream movement is illustrated by arrow 48 and the inward flow is illustrated by arrow 50. With the process being repeated as the flow moves downstream relative to the rotor 14 and barrel 16.

Figure 13:
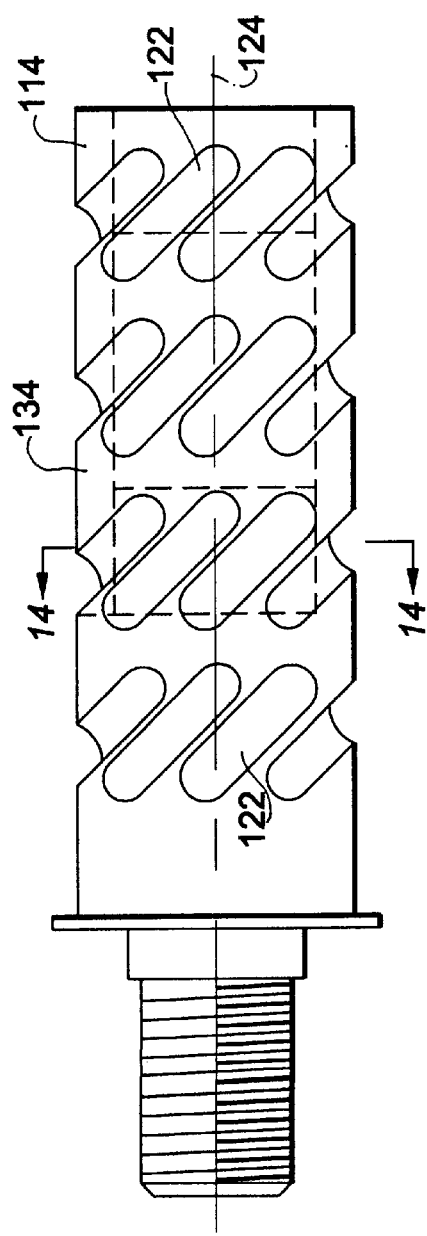
FIG. 13 is a side elevation view of an alternative rotor design having helical outer grooves.

FIGS. 13 and 14 illustrate an alternative or second embodiment in which a rotor 114 is provided with arcuate and linear rows of helical rotor flow transfer cavities or grooves 122 which are oriented with their longitudinal axis canted 45 degrees from the axis of rotor 114. Cavities 114 are also aligned linearly and annularly in the manner of cavities 22 of rotor 14. The adjacent rows of annular rings of rotor flow transfer cavities are separated by outwardly extending ring flanges 134. Rotor 114 is identical to rotor 14 in all other respects and is usable with floating sleeve 12, extruder screw 10 etc. in the same manner as rotor 14.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A mixer for plasticable resins and additives comprising a fixedly positioned heated barrel having an inwardly facing cylindrical surface defining a bore, a power driven screw having an upstream portion and a downstream end mounted axially in said bore, a driven rotor axially aligned with and extending in a downstream direction from the downstream end of said power driven screw, a series of elongated rotor flow transfer cavities in the outer surface of said rotor, said rotor having a central axis, said rotor flow transfer cavities extending inwardly arranged in a plurality of axially aligned rows and a plurality of annular rows concentric to the axis of said rotor, and a floating sleeve coaxially positioned over the rotor and interposed between the rotor and the barrel so as to be capable of independent rotation relative to said rotor, said floating sleeve having an outer sleeve surface spaced from said inwardly facing cylindrical surface of said barrel and an inwardly facing cylindrical surface matingly fitted over said rotor and a plurality of parallel outwardly extending ring flanges extending radially outwardly from said outer sleeve surface and each having an outer extent defined by a cylindrical surface facing said inwardly facing cylindrical barrel surface, a plurality of annular and elongated in cross-section outer sleeve flow channels each having an upstream end and a downstream end provided between adjacent ones of said outwardly extending ring flanges, a series of outflow apertures extending through said floating sleeve and each having an outer end communicating with the upstream end of an elongated outer sleeve flow channel of said floating sleeve flow channel and an inner end communicating with the downstream end of one of said elongated rotor flow transfer cavities of said rotor, and a series of inflow apertures extending through said floating sleeve and having an outer end communicating with the downstream end of said elongated outer sleeve flow channel and an inner end communicating with the upstream end of a next downstream adjacent elongated flow transfer cavity of said rotor.

2. A mixer as recited in claim 1 wherein said rotor includes a plurality of outwardly extending annular radial rings equidistantly spaced along the length of said rotor and each of said radial rings having a cylindrical surface engaging the inwardly facing surface of said floating sleeve.

3. A mixer as recited in claim 2 wherein the portion of the inwardly facing surface of the floating sleeve that is engaged by said radial rings of the rotor is between said outflow apertures and said inflow apertures of said floating sleeve.

4. A mixer as recited in claim 3 wherein said floating sleeve is capable of relative axial movement with respect to said rotor.

5. A mixer as recited in claim 1 wherein said rotor flow cavities each have a longitudinal axis oriented at approximately 45 degrees with respect to the axis of said driven rotor.

6. A mixer as recited in claim 5 wherein said rotor includes a plurality of outwardly extending annular radial rings equidistantly spaced along the length of said rotor and each of said radial rings having a cylindrical surface engaging the inwardly facing surface of said floating sleeve.

7. A mixer as recited in claim 6 wherein the portion of the inwardly facing surface of the floating sleeve that is engaged by said radial rings of the rotor is between said outflow apertures and said inflow apertures of said floating sleeve.

8. A mixer as recited in claim 7 wherein said floating sleeve is capable of relative axial movement with respect to said rotor.

9. A mixer as recited in claim 1 wherein said floating sleeve is capable of relative axial movement with respect to said extruder screw.

10. A mixer as recited in claim 9 wherein said floating sleeve has a sleeve valve seat surface on its forward end and said extruder screw has a screw valve seat surface facing said sleeve valve seat surface so that movement of said extruder screw axially toward said floating sleeve brings said valve seat surface into sealing contact so as to preclude subsequent flow of molten material into the interior of the floating sleeve.

11. A method of mixing polymers in a barrel having a heated cylindrical inner surface, said method comprising the steps of:

A. forcing polymer axially along the length of the interior of said barrel by mechanical means while said polymer is in contact with the inner surface of the barrel;

B. directing the polymer inwardly from contact with the inner surface of the barrel into an annular chamber extending about the periphery of a driven rotor;

C. directing the polymer outwardly from the annular chamber through openings in a sleeve coaxially mounted over said rotor so as to be freely rotatable relative to the rotor or that the polymer flows into an annular cavity encircling the sleeve; and D. directing the polymer inwards through a second opening in the sleeve to a second annular chamber in the rotor.

* * * * *